United States Patent
Murao

(10) Patent No.: US 11,007,706 B2
(45) Date of Patent: May 18, 2021

(54) THREE-DIMENSIONAL MODELING APPARATUS AND METHOD OF PRODUCING THREE-DIMENSIONALLY MODELED OBJECT

(71) Applicant: CANON KABUSHIKI KAISHA, Tokyo (JP)

(72) Inventor: Hitoshi Murao, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 197 days.

(21) Appl. No.: 15/786,826

(22) Filed: Oct. 18, 2017

(65) Prior Publication Data

US 2018/0117834 A1    May 3, 2018

(30) Foreign Application Priority Data

Oct. 28, 2016  (JP) ............................. JP2016-212083
Aug. 10, 2017  (JP) ............................. JP2017-156167

(51) Int. Cl.
| | |
|---|---|
| *B29C 64/118* | (2017.01) |
| *B29C 64/209* | (2017.01) |
| *B29C 64/35* | (2017.01) |
| *B33Y 30/00* | (2015.01) |
| *B29C 64/295* | (2017.01) |
| *B29C 64/218* | (2017.01) |

(52) U.S. Cl.
CPC .......... *B29C 64/118* (2017.08); *B29C 64/209* (2017.08); *B29C 64/295* (2017.08); *B29C 64/35* (2017.08); *B33Y 30/00* (2014.12); *B29C 64/218* (2017.08)

(58) Field of Classification Search
CPC ... B29C 64/118; B29C 64/209; B29C 64/295; B29C 64/35; B33Y 30/00; B33Y 40/00; B33Y 50/02
See application file for complete search history.

(56) References Cited

U.S. PATENT DOCUMENTS

| | | | |
|---|---|---|---|
| 6,612,824 B2 | 9/2003 | Tochimoto et al. | |
| 9,126,365 B1* | 9/2015 | Mark | .................. B29C 48/0022 |
| 2004/0084814 A1* | 5/2004 | Boyd | .................... B29C 64/357 |
| | | | 264/497 |

(Continued)

FOREIGN PATENT DOCUMENTS

| | | |
|---|---|---|
| CN | 104708812 A | 6/2015 |
| JP | 2000-280354 A | 10/2000 |

OTHER PUBLICATIONS

Murao et al., U.S. Appl. No. 15/782,955, filed Oct. 13, 2017.

(Continued)

*Primary Examiner* — Jacob T Minskey
*Assistant Examiner* — Caroline Montiel
(74) *Attorney, Agent, or Firm* — Venable LLP

(57) ABSTRACT

A three-dimensional modeling apparatus includes a heating portion, a nozzle, a member, and an ejection port switching portion. The heating portion configured to heat and fuse a thermoplastic resin. The nozzle configured to guide the fused thermoplastic resin to an ejection port. The member disposed to be slidable on a distal end surface of the nozzle and provided with plural openings. The ejection port switching portion configured to align one opening among the plural openings with a distal end of the nozzle.

14 Claims, 13 Drawing Sheets

(56) References Cited

U.S. PATENT DOCUMENTS

| | | | |
|---|---|---|---|
| 2014/0042657 A1* | 2/2014 | Mulliken | B29C 64/386 |
| | | | 264/40.1 |
| 2014/0159273 A1* | 6/2014 | Koop | B29C 48/154 |
| | | | 264/129 |
| 2015/0165682 A1* | 6/2015 | Chang | B33Y 10/00 |
| | | | 425/166 |
| 2015/0174824 A1* | 6/2015 | Gifford | B29C 64/20 |
| | | | 425/183 |
| 2016/0031159 A1* | 2/2016 | Church | B29C 48/25686 |
| | | | 264/308 |
| 2016/0059495 A1* | 3/2016 | Laubersheimer | B41J 2/16517 |
| | | | 264/39 |

OTHER PUBLICATIONS

First Office Action in Chinese Application No. 201711016612.X (dated Nov. 4, 2019).
Second Office Action in Chinese Application No. 201711016612.X (dated May 11, 2020).
Geng Xiaozheng (ed.), "Plastics Mixing and Continuous Mixing Equipment," p. 354 (China Light Industry Press) (2008).

* cited by examiner

THREE-DIMENSIONAL MODELING APPARATUS AND METHOD OF PRODUCING THREE-DIMENSIONALLY MODELED OBJECT

BACKGROUND OF THE INVENTION

Field of the Invention

The present invention relates to a three-dimensional modeling apparatus that forms a three-dimensionally modeled object by fusing, ejecting, and depositing resin. More specifically, the present invention relates to a technique of changing a sectional shape of ejected fused resin.

Description of the Related Art

In recent years, so-called 3D printers have been actively developed, and various methods have been attempted. For example, methods such as fused deposition modeling, stereolithography, and selective laser sintering are known.

Fused deposition modeling is a method of forming a three-dimensional object by ejecting heated thermoplastic resin through, for example, a nozzle, and depositing the thermoplastic resin. This method is simple in principle, and thus has a merit that this method can be performed by a small apparatus at relatively low cost.

Japanese Patent Laid-Open No. 2000-280354 discloses a fused deposition modeling apparatus provided with plural nozzles for ejecting different materials to change the color or physical properties of a three-dimensional object between parts thereof.

When forming a three-dimensionally modeled object by fused deposition modeling, the flexibility of a modeling process increases if the ejection condition of fused resin can be changed. Particularly, improvement of the precision of the shape of the modeled object and reduction of modeling time have been desired, and thus an apparatus capable of easily changing the sectional shape of ejected fused resin has been desired.

Since the fused deposition modeling apparatus disclosed in Japanese Patent Laid-Open No. 2000-280354 include plural nozzles, varying the shape of an ejection port between nozzles can be considered. However, there is a problem that the apparatus becomes larger and more expensive when plural nozzles are provided.

SUMMARY OF THE INVENTION

According to a first aspect of the present invention, a three-dimensional modeling apparatus includes a heating portion configured to heat and fuse a thermoplastic resin, a nozzle configured to guide the fused thermoplastic resin to an ejection port, a member disposed to be slidable on a distal end surface of the nozzle and provided with plural openings, and an ejection port switching portion configured to align one opening among the plural openings with a distal end of the nozzle.

According to a second aspect of the present invention, a method of producing a three-dimensionally modeled object, the method includes a first step of causing a thermoplastic resin to be ejected through one opening among plural openings in a member provided with the plural openings, and a second step of causing the thermoplastic resin to be ejected through another opening among the plural openings different from the one opening.

Further features of the present invention will become apparent from the following description of exemplary embodiments with reference to the attached drawings. The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Exemplary embodiments of the present invention will be described below with reference to drawings.

First Exemplary Embodiment

Figure 1:
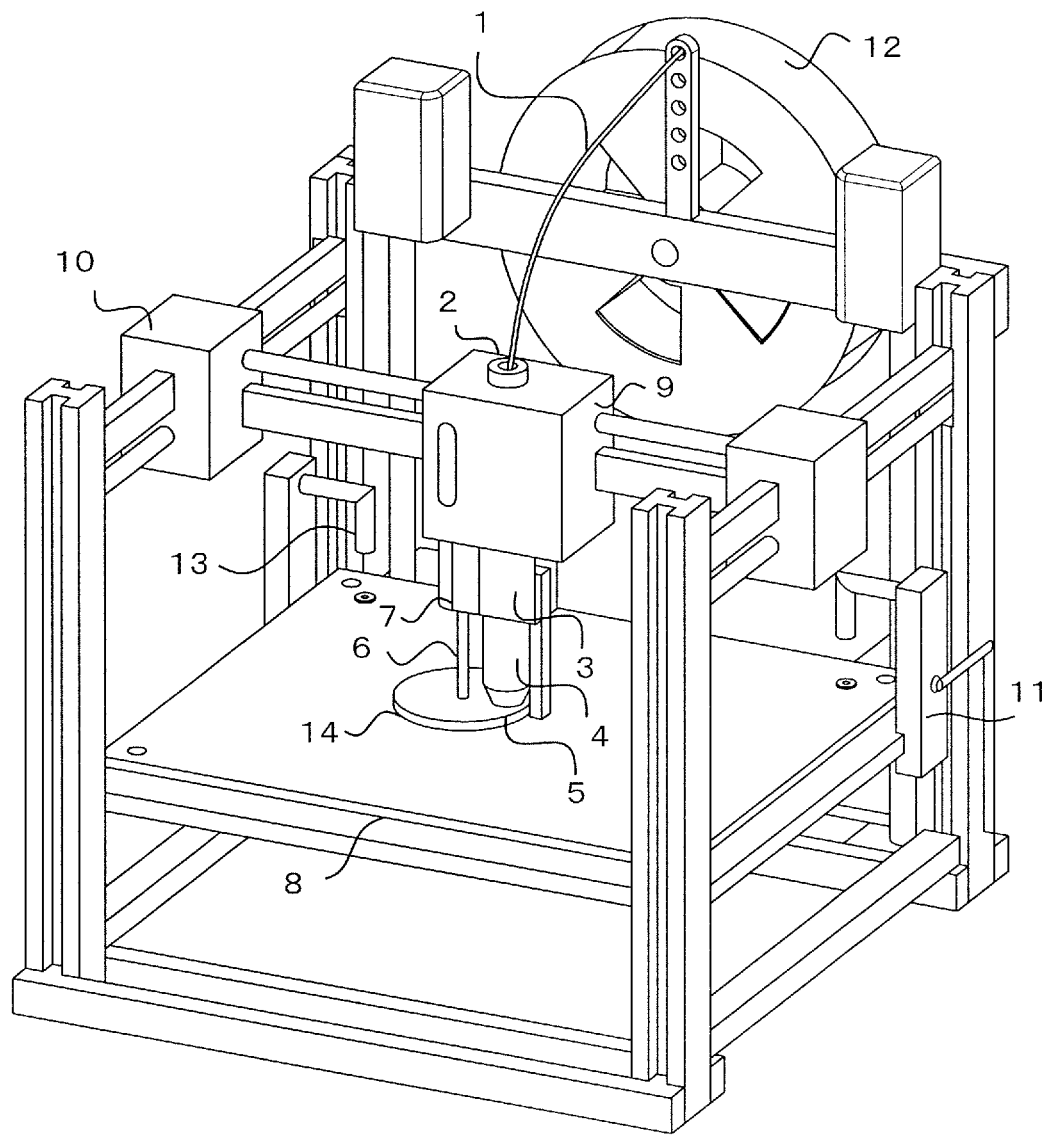
FIG. 1 is a perspective view of a three-dimensional modeling apparatus of a first exemplary embodiment.

FIG. 1 is a perspective view of a fused deposition modeling apparatus serving as a first exemplary embodiment of the present invention.

The fused deposition modeling apparatus includes a material introduction portion 2, a heating supplying portion 3, a nozzle 4, an ejection port switching portion 5, a switch drive shaft 6, a switch driving device 7, a stage 8, an X movement mechanism 9, a Y movement mechanism 10, a Z movement mechanism 11, a reel 12, and a cleaning mechanism 13, and a modeling material 1 is set in the material introduction portion 2.

The modeling material 1 is a raw material used for three-dimensional modeling. Although a thermoplastic resin shaped into a filament is used as the modeling material 1 in the present exemplary embodiment, a material of another shape such as a pellet or powder may be also used.

The filament used as the modeling material 1 preferably has, for example, a circular sectional shape, a diameter of 1.5 to 3.0 mm, and a length of 10 to 1000 m. The modeling material 1 is stored by being wound up around the reel 12. The modeling material 1 can be supplied to the material introduction portion 2 by rotating the reel 12.

Examples of the thermoplastic resin that can be used in the present exemplary embodiment include polycarbonate (PC) resin, acrylonitrile-butadiene-styrene copolymer (ABS) resin, PC/ABS polymer alloy, polylactic acid (PLA) resin, polyphenylene sulfide (PPS) resin, polyetherimide (PEI) resin, polyethylene terephthalate (PET) resin, and modified resins of these.

Figure 2:
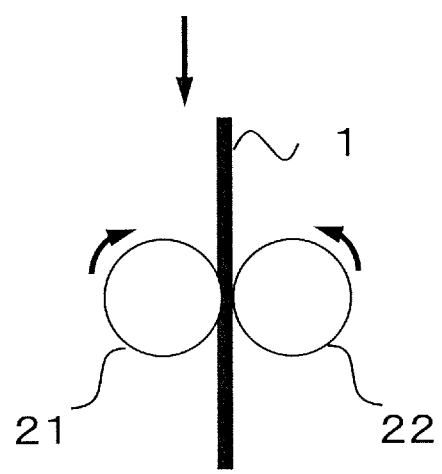
FIG. 2 illustrates a taking-in mechanism for a thermoplastic resin filament.

The heating supplying portion 3 takes in the thermoplastic resin serving as the modeling material 1, heats the modeling material 1 to a glass transition temperature (Tg) or higher to fuse the thermoplastic resin, and then supplies the thermoplastic resin to the nozzle 4. FIG. 2 illustrates a taking-in mechanism included in the heating supplying portion 3 for taking in the filament-shaped modeling material 1.

As illustrated in FIG. 2, the filament-shaped modeling material 1 is nipped by rollers 21 and 22, and can be taken in from the reel 12 and sent into a heating portion by rotating the rollers 21 and 22 in directions indicated by arrows in FIG. 2. The amount of modeling material 1 supplied to the heating portion can be adjusted by controlling the rotation speed of the rollers 21 and 22. In addition, ejection of the thermoplastic resin pushed out of a distal end portion of the nozzle 4 that will be described later can be stopped by rotating the rollers 21 and 22 in directions opposite to the directions indicated by the arrows in FIG. 2.

The heating portion that is not illustrated heats and fuses the thermoplastic resin supplied from the taking-in mechanism. The heating portion includes a heater, and can adjust the temperature of the fused resin by controlling the amount of heat generated by the heater.

The thermoplastic resin in a fused state is sent into the nozzle 4 by being pushed by a succeeding material. The thermoplastic resin pushed to the distal end portion of the nozzle 4 is ejected through an ejection port selected by the ejection port switching portion 5. The details of the ejection port switching portion 5 will be described later.

The stage 8 supports a three-dimensionally modeled object being modeled on an upper surface thereof. The upper surface of the stage 8 is parallel to an X-Y plane defined by X and Y axes of the coordinate system in FIG. 2. In addition, a direction perpendicular to the X-Y plane is set as a Z direction.

The three-dimensional modeling apparatus of the present exemplary embodiment forms a three-dimensionally modeled object by drawing patterns of the thermoplastic resin by scanning the nozzle 4 so as to be relatively moved with respect to the stage 8 and depositing the patterns. In the apparatus of FIG. 1, the stage 8 can be moved along a Z axis by the Z movement mechanism 11. In addition, the nozzle 4 can be moved along the X-Y plane by the X movement mechanism 9 and the Y movement mechanism 10. The configuration of the apparatus is not necessarily limited to the example of FIG. 1 as long as the nozzle 4 and the stage 8 can be relatively moved in the three directions of the X, Y, and Z directions. For example, a configuration in which a stage is fixed and a nozzle can be moved in the three directions of the X, Y, and Z directions may be employed.

Ejection Port Switching Portion

Next, the details of the ejection port switching portion 5 will be described. In the apparatus of the present exemplary embodiment, the ejection port switching portion 5 includes a circular plate-like member 14. The center of the plate-like member 14 is fixed to the switch drive shaft 6, and the plate-like member 14 also rotates when the switch drive shaft 6 rotates. The switch drive shaft 6 is rotated and stopped at a certain angle by a driving force applied by the switch driving device 7.

Figure 3:
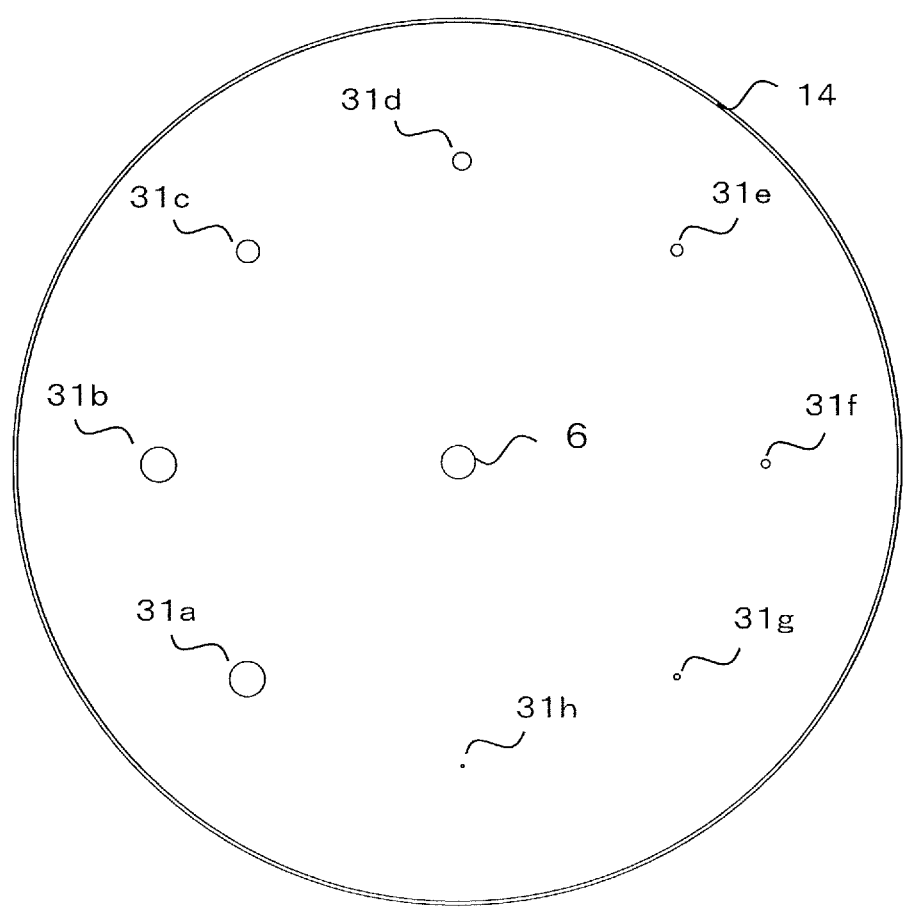
FIG. 3 is a plan view of a plate-like member of an ejection port switching portion of the first exemplary embodiment.

FIG. 3 illustrates a plan view of the plate-like member 14. In the present exemplary embodiment, eight circular openings 31*a* to 31*h* serving as ejection ports for the thermoplastic resin are defined in the plate-like member 14, and the diameters thereof are different from one another.

The openings 31*a* to 31*h* are arranged with intervals therebetween on a circumference of a circle centered on the switch drive shaft 6 such that the distal end portion of the nozzle 4 can overlap one of the openings 31*a* to 31*h* in the case where the plate-like member 14 is rotated about the switch drive shaft 6. By rotating the plate-like member 14 coupled with the switch drive shaft 6 by the switch driving device 7, any one of the openings 31*a* to 31*h* can be caused to overlap the distal end portion of the nozzle 4, and a portion not provided with an opening can be caused to overlap the distal end portion of the nozzle 4.

Any device may be used as the switch driving device 7 as long as the switch driving device 7 can rotate the plate-like member 14 coupled with the switch drive shaft 6 and switch the opening that overlaps the nozzle 4 among the openings 31*a* to 31*h*. For example, a method of rotating the switch drive shaft 6 by just a desired angle by a typical electric motor such as a stepping motor that generates a rotational force to switch the openings 31*a* to 31*h* may be employed. In addition, a mechanism that includes an encoder for detecting the rotational position of the switch drive shaft 6 or the plate-like member 14 or a clutch or a brake for stopping the rotation and fixing the position may be employed.

The diameter of the thermoplastic resin ejected as a columnar viscous fluid can be controlled by appropriately selecting the opening to overlap the distal end portion of the nozzle 4 among the eight openings 31*a* to 31*h*. In addition, the plate-like member 14 functions as a shutter in the case where a portion thereof not provided with an opening is caused to overlap the distal end portion of the nozzle 4, and thus the ejection of the thermoplastic resin can be stopped. Alternatively, the pushing of the thermoplastic resin pushed out of the distal end portion of the nozzle 4 that will be described later can be stopped by rotating the rollers 21 and 22 in the directions opposite to the directions indicated by the arrows in FIG. 2. Therefore, the opening to overlap the nozzle 4 among the openings 31*a* to 31*h* can be switched by rotating the plate-like member 14 after stopping the pushing of the thermoplastic resin.

The material of the plate-like member 14 is preferably metal. Particularly, steel having a high toughness and a high thermal conductivity is preferably used. Examples of the preferable material include SUS420J2, SKD61, and pre-hardened steel.

In addition, various coating treatment may be performed for the purpose of improving the durability of the plate-like member 14 and resin releasability of the openings 31*a* to 31*h*. For example, coating treatment using diamond-like carbon (DLC) used for parts of a machine tool, molds for injection molding, and so forth may be employed. Further, surface effect treatment such as nitriding treatment and high-frequency firing, and so forth are also effective for improving the durability. A case where treatment is performed on a contact portion between the plate-like member 14 and the nozzle 4 for improving the slidability and durability of the contact portion, a case where treatment is performed on the inner surfaces of the openings 31a to 31h which the fused resin passes through, and so forth can be considered.

Although the openings 31a to 31h have circular shapes of different diameters in the present exemplary embodiment, the shapes of the openings 31a to 31h are not limited to the shapes described above, and various shapes can be considered.

For example, in the case where the sectional shape of the ejected resin is desired to be changed in terms of an aspect ratio between the X or Y direction and the Z direction, elliptical shapes and rectangular shapes whose aspect ratio is not 1 can be considered.

It is preferable that the thickness of the plate-like member 14 is small as long as a mechanical strength is ensured. In the case where the thickness is larger, the heat capacity becomes larger. In this case, the plate-like member 14 cannot be sufficiently heated by only heat conduction from the nozzle 4 and the thermoplastic resin, and thus there is a possibility that the temperature near the openings 31a to 31h drops and clogging with the fused resin occurs.

In the case of increasing the thickness of the plate-like member 14, a heating mechanism can be attached to or included in the plate-like member 14. Since it is typically preferable that the fused thermoplastic resin is caused to flow in the nozzle 4 at a temperature of about 200° C., it is desirable that the nozzle 4 and the plate-like member 14 are also kept at about 200° C. By including the heating mechanism, the plate-like member 14 can be kept at about 200° C. the whole time, and thus clogging of the openings 31a to 31h with the fused resin can be suppressed. In addition, also in the case where the opening is switched while modeling is performed, the temperature of the vicinity of an opening to which the switching has been performed is kept at an appropriate temperature. Therefore, it is not needed to wait for the temperature to rise, and thus the time loss for the switching can be reduced.

In the case of increasing the thickness of the plate-like member 14 without attaching or including the heating mechanism, a method of reducing the heat capacity of the plate-like member 14 by providing lightening holes that reduce the weight of the plate-like member 14 is also effective. In this case, in order to prevent the rigidity of the plate-like member 14 from decreasing, it is preferable to provide lightening holes that can ensure the rigidity while reducing the weight, such as lightening holes having a honeycomb shape.

As described above, any member can be used as the plate-like member 14 of the present exemplary embodiment as long as the plate-like member 14 is provided with an opening serving as an ejection port, the mechanical strength of the plate-like member 14 is ensured, and the plate-like member 14 can be kept at a temperature at which the thermally fused resin is not solidified. Accordingly, this member may be referred to as an ejection port member instead of a plate-like member. Although this member is referred to as a plate-like member in the description of the present exemplary embodiment, the shape of the member is not necessarily a flat plate shape, and members of various three-dimensional shapes can be used.

Figure 4A:
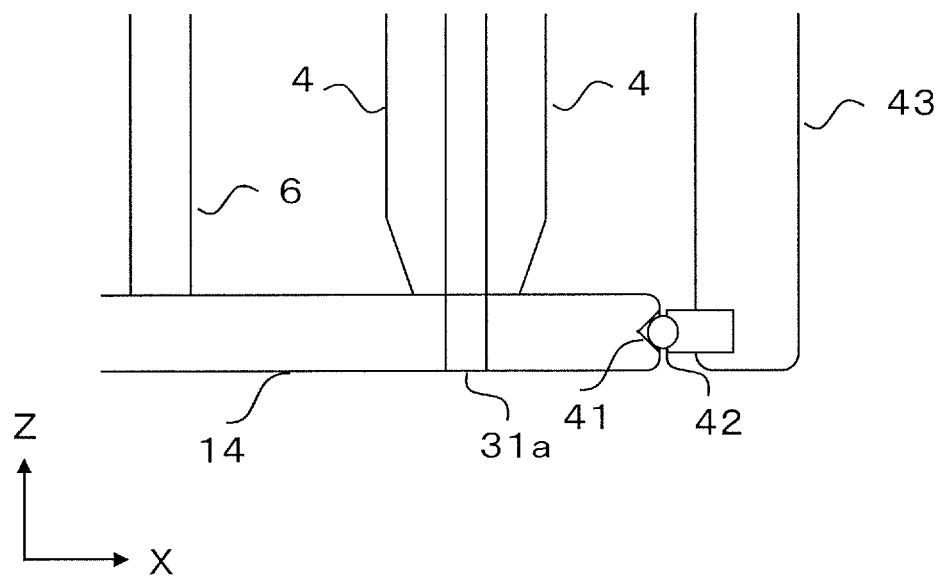
FIG. 4A is a section view of the ejection port switching portion.
Figure 4B:
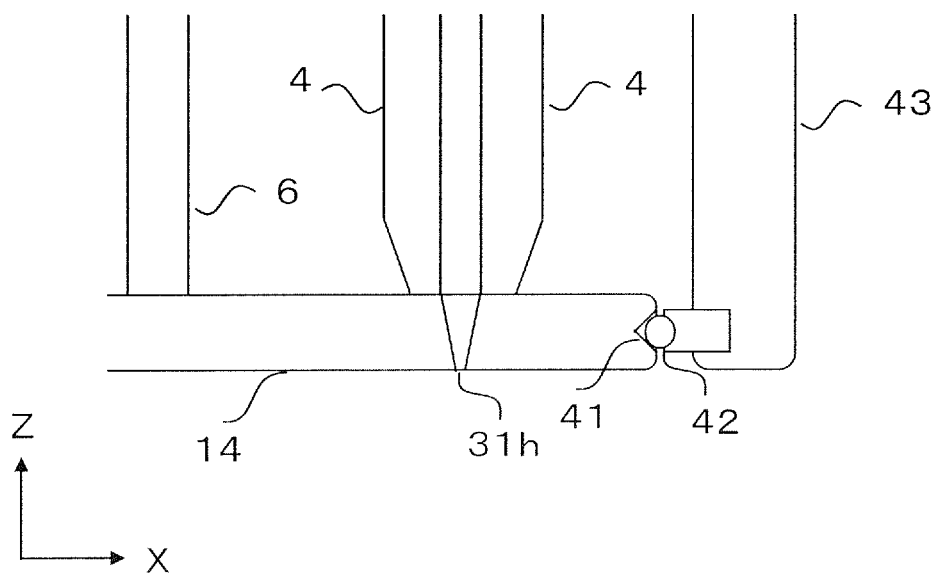
FIG. 4B is a section view of the ejection port switching portion illustrating a case where an ejection port is tapered.

FIGS. 4A and 4B are sectional views of the ejection port switching portion 5 of the first exemplary embodiment illustrating the structure thereof.

The plate-like member 14 is disposed so as to be slidable on a distal end surface of the nozzle 4. There is a possibility that the fused resin leaks in the case where the plate-like member 14 and the distal end surface of the nozzle 4 are away from each other by 50 µm or more, and thus the plate-like member 14 is supported so as to be slidable on the distal end surface of the nozzle 4 while ensuring a sealing property.

The plate-like member 14 includes a recess portion 41 for positioning on a side surface thereof. The recess portion 41 has a shape capable of engaging with a projection portion 42 that is supported by a holding member and capable of moving back and forth, and thus the rotation angle of the plate-like member 14 can be defined. In addition, with this configuration, the deformation and inclination of the plate-like member 14 in the Z direction caused by the pressure from the resin pushed out of the nozzle 4 can be regulated.

To be noted, the shapes of the recess portion 41 and the projection portion 42 are not limited as long as these two can be engaged with each other. For example, in the case of just regulating the deformation and inclination in the Z direction, a configuration in which movement in a rotational direction is not regulated by providing the recess portion 41 as a ring-shaped groove around the side surface of the plate-like member 14 can be employed. Meanwhile, in the case where it is desired that a regulating force is exhibited at a rotational position at which an opening overlaps the nozzle 4, it is preferable that a groove of the recess portion 41 on an extension line passing through the switch drive shaft 6 and each opening is deep.

In addition, in the case of providing the projection portion 42 with a movable mechanism, for example, a configuration using a spring such as a ball plunger, and a configuration of linear driving such as a piston mechanism using air pressure, oil pressure, or the like may be employed. In addition, examples of a fixed configuration include a rail and a key groove.

To be noted, conversely of the present exemplary embodiment, a configuration in which the projection portion 42 is provided on the plate-like member 14 and the recess portion 41 is provided on the holding member 43 may be employed. Either case may be selected as long as the relative positional relationship between the plate-like member 14 and the nozzle 4 can be regulated.

FIG. 4A illustrates a state in which the opening 31a that has the largest diameter among the openings 31a to 31h is aligned with the outlet of the nozzle 4. The opening 31a has a diameter equal to the diameter of the outlet of the nozzle 4, and penetrates from the front surface to the back surface of the plate-like member 14 in a constant diameter.

FIG. 4B illustrates a state in which the opening 31h that has the smallest diameter among the openings 31a to 31h is aligned with the outlet of the nozzle 4. The opening 31h has a diameter equal to the outlet of the nozzle 4 on the nozzle 4 side, and is tapered such that the diameter thereof gradually decreases from the nozzle 4 side to the lower surface side serving as an outlet for the thermoplastic resin.

As described above, by setting the area of the opening to be large on the side in contact with the nozzle 4 and setting the area of the opening on the outlet side to be small by gradually changing the area of the opening, the sectional area of the ejected fused resin can be reduced while suppressing the loss of pressure in a resin path in the plate-like member 14.

Switching of Ejection Port

In the apparatus of the present exemplary embodiment, the switching between the openings 31a to 31h can be performed at an arbitrary timing. The switching can be performed in an interval of forming plural modeled objects and during formation of one modeled object in accordance with a control program for three-dimensional modeling. According to this, a three-dimensionally modeled object whose fineness of shape is partially changed can be produced easily.

For example, by modeling the outside of the modeled object by using an ejection port of a small opening diameter and modeling the inside of the modeled object by using an ejection port of a large opening diameter, modeling can be performed while achieving a high precision of the outer shape of the modeled object and reduction of modeling time at the same time.

That is, a three-dimensionally modeled object is produced through a first step of ejecting a thermoplastic resin through one opening among plural openings having different areas or shapes provided in a member and a second step of ejecting the thermoplastic resin through an opening among the plural openings different from the one opening. According to this, a three-dimensionally modeled object whose fineness of shape is partially changed can be produced easily. In addition, modeling can be performed while achieving a high precision of the outer shape of the modeled object and reduction of modeling time at the same time. In addition, a portion not provided with an opening of the member provided with the plural openings can function as a shutter. That is, the ejection of the thermoplastic resin can be stopped between the first step and the second step by the portion not provided with an opening of the member provided with plural openings. This can be regarded as a step of stopping. According to this, switching of ejection port can be performed easily, securely, and precisely.

Cleaning Mechanism

The three-dimensional modeling apparatus of the present exemplary embodiment can use plural ejection ports in a switchable manner as described above, and includes the cleaning mechanism 13 for cleaning the ejection ports. Although the frequency of usage and period of suspension are different between ejection ports, the cleaning mechanism 13 is useful for preventing clogging and using and keeping the ejection ports in a clean state.

Figure 5:
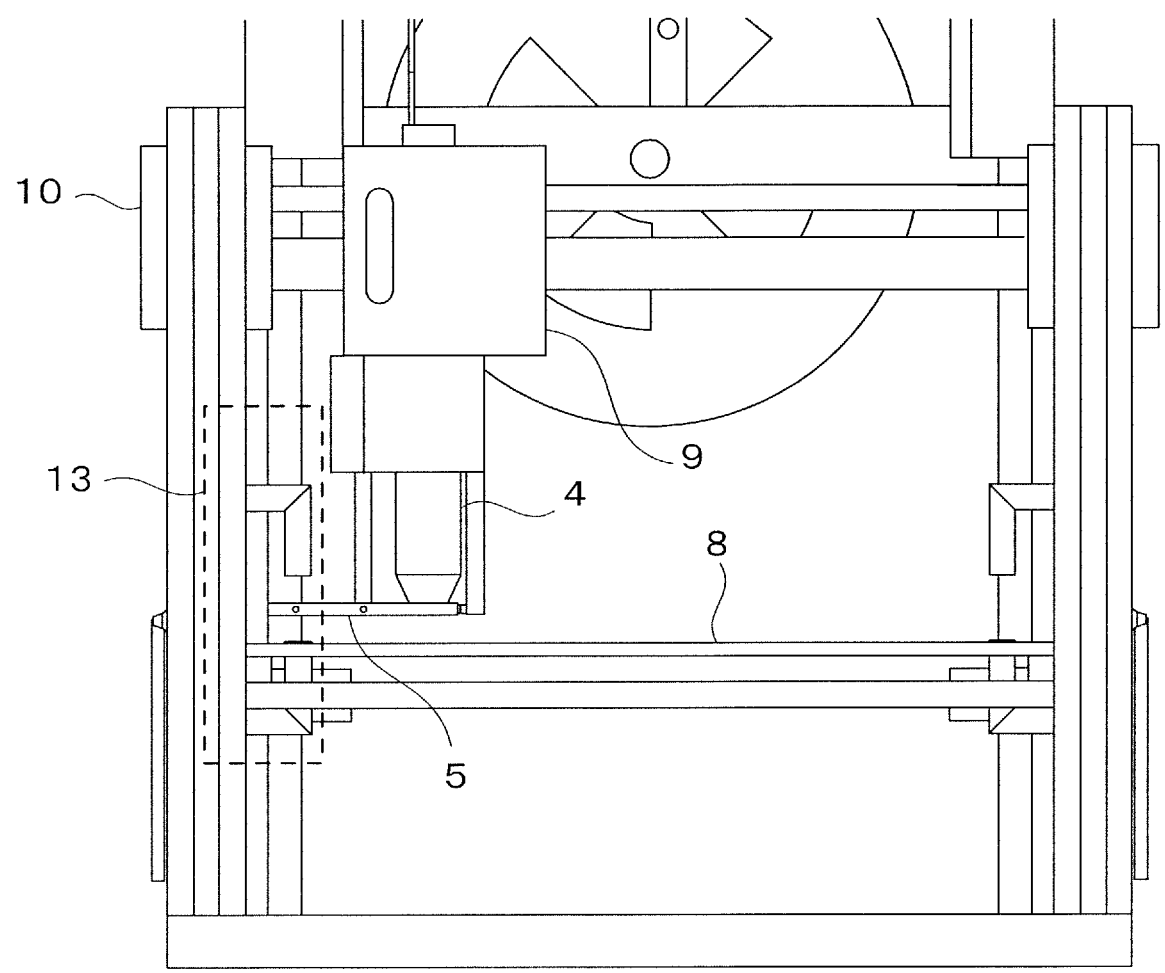
FIG. 5 is a front view of a cleaning mechanism.

FIG. 5 is a front view of the three-dimensional modeling apparatus illustrated in FIG. 1 in a state in which the ejection port switching portion 5 has been moved to the position of the cleaning mechanism 13 disposed at an end portion of the stage 8 for cleaning.

The ejection port switching portion 5 is moved to the position of the cleaning mechanism 13 and cleaned, for example, immediately before starting modeling, when need for cleaning an ejection port arises during modeling, or after finishing modeling.

Figure 6:
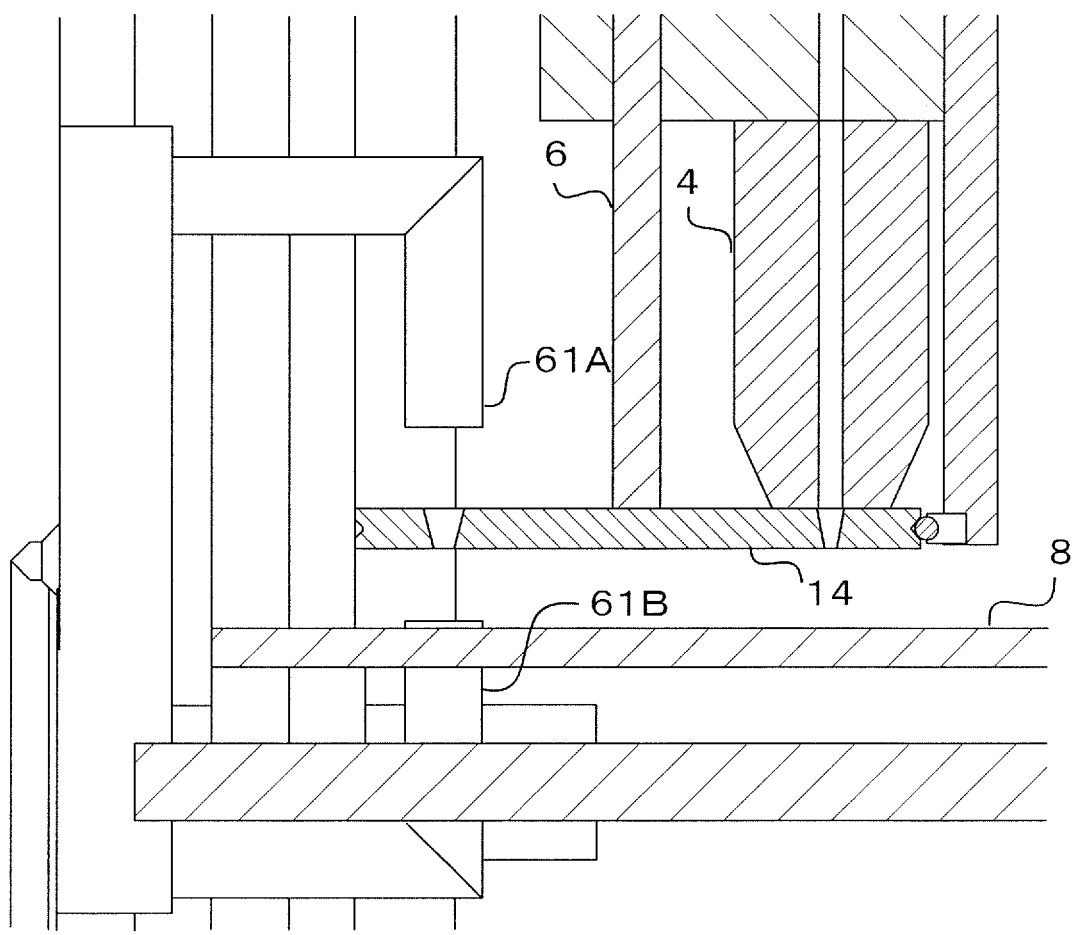
FIG. 6 is an enlarged section view of the cleaning mechanism.

FIG. 6 is an enlarged section view of the vicinity of the cleaning mechanism 13. In the apparatus of the present exemplary embodiment, cleaning is performed by peeling off resin attached to the inside or periphery of ejection ports by blowing air to the ejection ports of the plate-like member 14.

The cleaning mechanism 13 is provided with air blowing ports 61A and 61B, and is capable of blowing air out downward or upward in the Z direction. In a cleaning operation, air is blown such that the air flows in such a direction that resin remaining in the openings 31a to 31h is more likely to be removed. Here, the direction such that the remaining resin is more likely to be removed refers to a direction toward the side of a larger opening area in the case where the area of the opening portion is different between the upper side and the lower side as in the case where the section of the opening has a tapered shape. For example, in the case of FIG. 6, air is blown out from the air blowing port 61B in the Z direction.

In addition, alternately blowing air from the air blowing ports 61A and 61B to peel off the attached resin is also an effective way of cleaning.

The cleaning mechanism 13 is capable of cleaning an arbitrary ejection port by operating in coordination with the switch driving device 7. A selected ejection port can be cleaned by moving an opening to be cleaned to the position of the air blowing ports 61A and 61B by rotating the switch drive shaft 6, stopping the movement, and blowing air. In addition, all the ejection ports can be cleaned by blowing air while rotating the plate-like member 14.

For example, in the case of switching the opening to the opening 31c after ejecting the fused resin by using the opening 31a of FIG. 3, the opening can be switched by rotating the plate-like member 14 clockwise, and, although for a short period of time, the opening 31b overlaps the nozzle 4 during the rotation. At this time, there is a possibility that, although a small amount, resin attaches to the opening 31b. Therefore, in this case, it is desirable that the opening 31b positioned in the switching path is also cleaned in addition to the openings 31a and 31c used for ejection after finishing the three-dimensional modeling. In other words, it is desirable that openings having opposed the nozzle 4 filled with fused resin including an opening positioned in the switching path are cleaned before the next three-dimensional modeling process.

To be noted, the system of the cleaning mechanism 16 is not limited to the example illustrated in FIG. 6, and any other system may be employed as long as the openings 31a to 31h can be cleaned. Instead of cleaning using gas such as air, a configuration of removing resin by splashing liquid on or inserting solid in the openings 31a to 31h may be employed. For example, there is a method of performing cleaning by inserting a pin having a smaller sectional area than an opening and formed of metal or the like in the opening and moving the pin up and down. Alternatively, a brush or the like may be used. In the case of removing the resin by using a pin, a brush, or the like, it is preferable that a cleaning tool of a material softer than the plate-like member 14 is used so as not to damage the plate-like member 14. For example, in the case where the material of the plate-like member 14 is SUS430J2, brass or aluminum is used for the pin, brush, or the like.

The cleaning mechanism 13 may be disposed at any position of the stage 8 as long as the cleaning mechanism 13 does not interrupt modeling and can clean the plate-like member 14 and the openings 31a to 31h. Alternatively, a cleaning mechanism may be integrally provided with an ejection head instead of being disposed on a part of a stage.

Control Blocks

Figure 7:
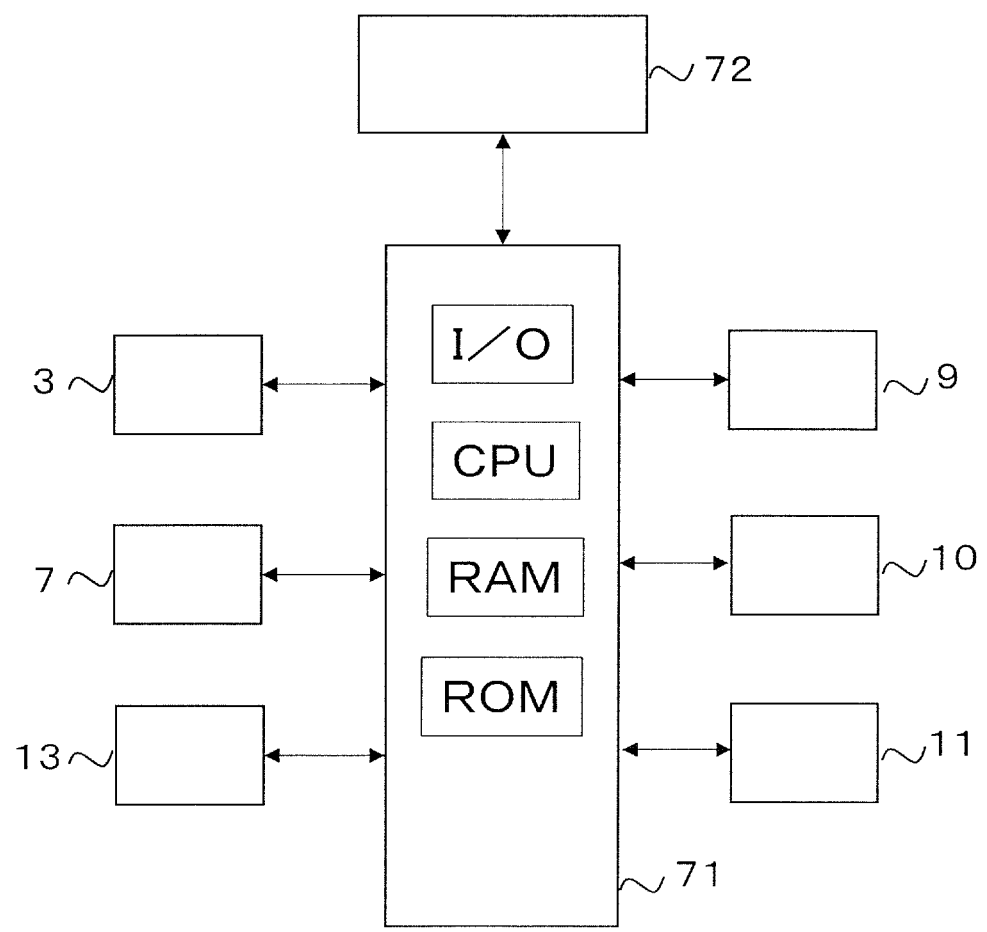
FIG. 7 is a control block diagram of the three-dimensional modeling apparatus.

FIG. 7 briefly illustrates control blocks of the present exemplary embodiment.

A control portion 71 is a control circuit for controlling operation of each component of the three-dimensional modeling apparatus. The control portion 71 includes a central processing unit: CPU, a read-only memory: ROM, a random access memory RAM, an input/output port: I/O port, and so forth. The ROM is a nonvolatile memory that stores a control program and a table of values for control. The RAM is a volatile memory used for computation and the like. The I/O port is used for communication with the outside and with components inside the apparatus. To be noted, the ROM stores a program for controlling a basic operation of the three-dimensional modeling apparatus and a program related to switching of ejection port and a sequence of cleaning of ejection port.

An operation panel 72 is provided for a user that uses the three-dimensional modeling apparatus. The operation panel 72 includes an input portion for an operator of the three-dimensional modeling apparatus to give an instruction to the apparatus, and a display portion for displaying information to the operator. The input portion includes a keyboard and operation buttons. The display portion includes a display panel that displays an operation state of the three-dimensional modeling apparatus and so forth.

The control portion 71 performs each step of three-dimensional modeling by controlling each component of the three-dimensional modeling apparatus on the basis of an instruction from the user input through the operation panel 72.

Specifically, the control portion 71 adjusts the supply of fused thermoplastic resin to the nozzle 4 by controlling the heating supplying portion 3. In addition, the control portion 71 selects an ejection port appropriate for modeling and sets the selected ejection port at the distal end of the nozzle 4 by controlling the switch driving device 7. In addition, the control portion 71 controls the cleaning mechanism 13 to perform air blowing to clean an opening. In addition, the control portion 71 controls the X movement mechanism 9, the Y movement mechanism 10, and the Z movement mechanism 11 to control the positions of the nozzle 4 and the stage 8 and thereby control pattern modeling in a three-dimensional modeling process, movement of the nozzle 4 to the cleaning mechanism 13, and so forth.

Sequence

In the present exemplary embodiment, a cleaning operation is performed at an appropriate time while the three-dimensional modeling apparatus is operating. Examples of this sequence will be described.

Figure 8A:
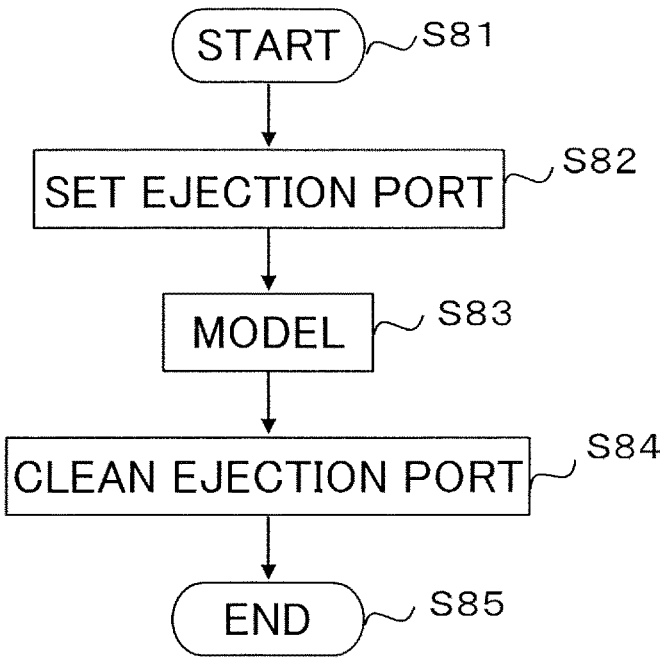
FIG. 8A illustrates an example of a cleaning sequence.
Figure 8B:
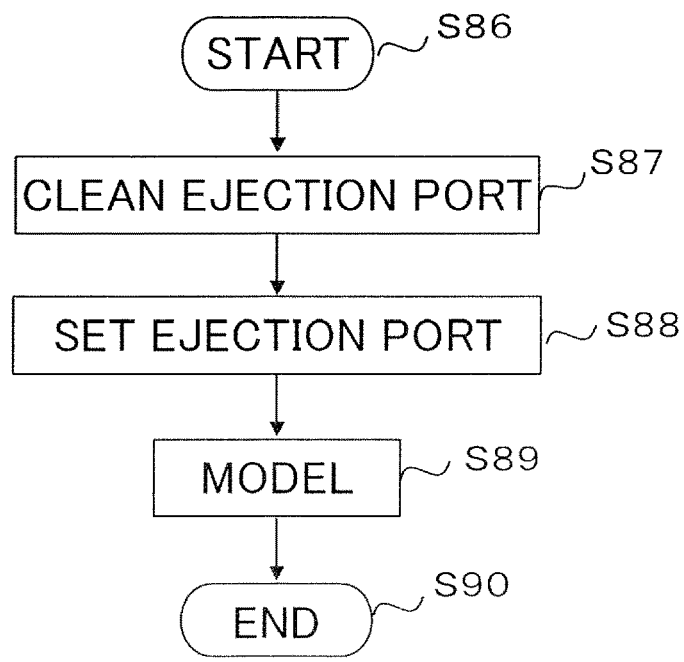
FIG. 8B illustrates another example of a cleaning sequence.
Figure 9:
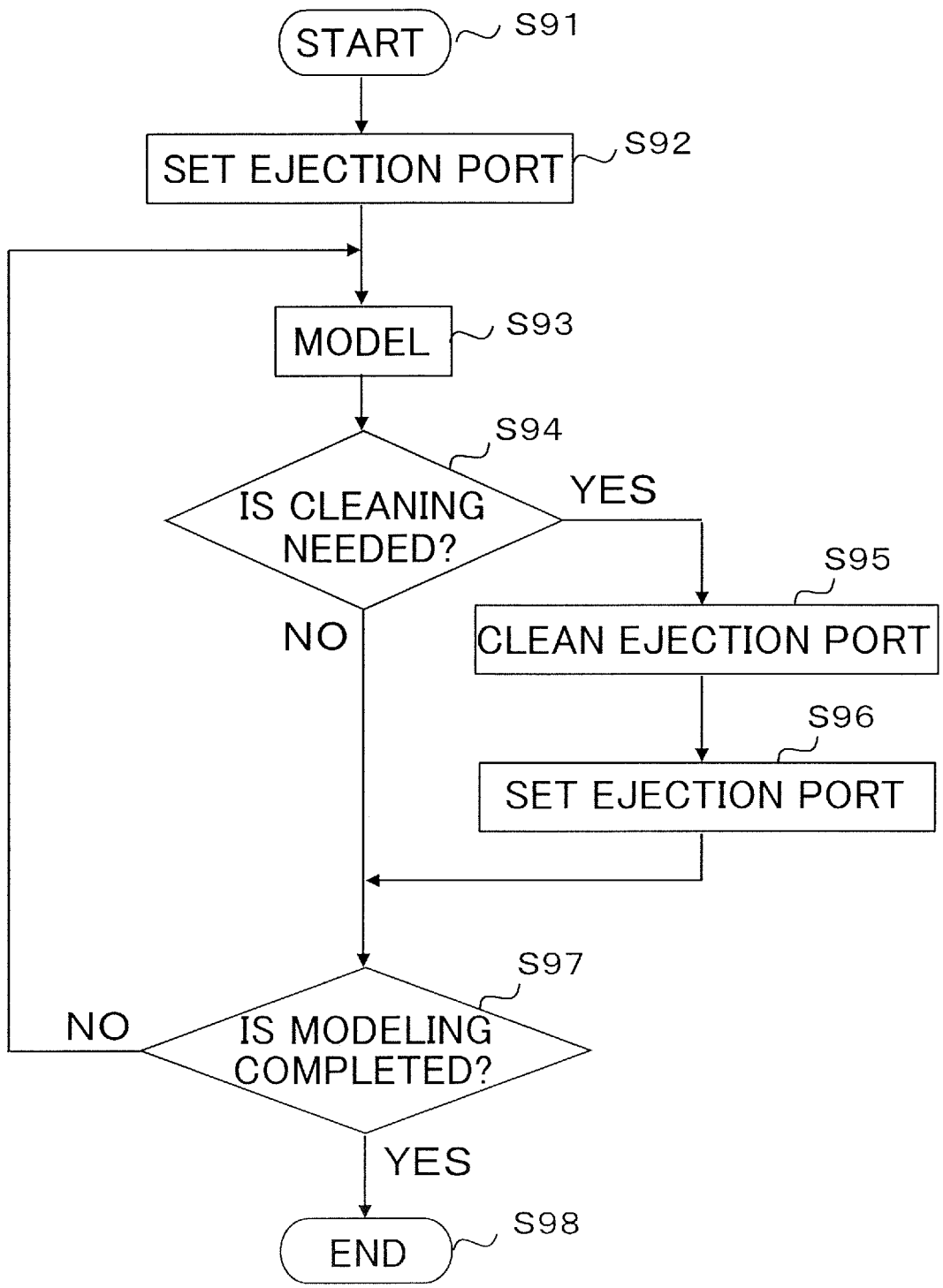
FIG. 9 illustrates yet another example of a cleaning sequence.

FIGS. 8A, 8B, and 9 illustrates exemplary flowcharts indicating timings of cleaning operations.

FIG. 8A illustrates a flow for performing a cleaning operation of an ejection port after completion of modeling to keep the ejection port clean for the next modeling. A three-dimensional modeling operation is started in step S81, and then an ejection port appropriate for modeling is selected and set at an outlet of the nozzle 4 in step S82. Three-dimensional modeling is performed in step S83, and, after the modeling is completed, the ejection port is cleaned in step S84. Then, the series of operations are finished in step S85. Since cleaning is performed after three-dimensional modeling, solidified resin is not left adhering to the vicinity of the ejection port, and the next modeling operation can be started quickly.

FIG. 8B illustrates a flow for performing a cleaning operation of an ejection port before starting modeling and then performing modeling with an ejection port whose cleanness is guaranteed. Three-dimensional modeling operation is started in step S86, and then an ejection port is cleaned in step S87. After this, an ejection port appropriate for modeling is selected, and the selected ejection port is set at the outlet of the nozzle 4 in step S88. Three-dimensional modeling is performed in step S89, and, after the modeling is completed, the series of operations are finished in step S90. Since cleaning is performed before three-dimensional modeling, the modeling can be performed by using an ejection port whose cleanness is guaranteed.

FIG. 9 illustrates a flow for a case where a cleaning operation is needed during a modeling operation. Three-dimensional modeling is started in step S91, and then an ejection port appropriate for modeling is selected, and the selected ejection port is set at the outlet of the nozzle 4 in step S92. While three-dimensional modeling is performed in step S93, whether or not cleaning is needed during the modeling operation is monitored in step S94. Specifically, whether or not cleaning is needed is monitored on the basis of the temperature of the fused resin, the elapsed time after starting the modeling operation, and so forth. In the case where cleaning is not needed, whether or not the modeling has been completed is determined in step S97. In the case where the modeling is not completed, the process returns to the modeling step S93, and the modeling continues. In the case where cleaning is needed, the ejection port is cleaned in step S95, the ejection port is set at the outlet of the nozzle 4 again in step S96, and the modeling continues in step S93 until the modeling is completed in step S97. In the case where it is determined that the modeling has been completed in step S97, the series of operations are finished in step S98. Since cleaning is performed when necessary during three-dimensional modeling, the three-dimensional modeling can continue to be performed by using an ejection port whose cleanness is guaranteed.

Typical timings of performing a cleaning operation has been described above with reference to the flowcharts of FIGS. 8A, 8B, and 9, and these may be employed separately or in combination. The timing of cleaning is not limited to these examples, and cleaning may be appropriately performed as necessary. For example, cleaning may be performed each time the ejection port is switched.

Second Exemplary Embodiment

A three-dimensional modeling apparatus of a second exemplary embodiment is different from the first exemplary embodiment in the structure of an ejection port switching portion.

The three-dimensional modeling apparatus of the second exemplary embodiment is common with the first exemplary embodiment in that the three-dimensional modeling apparatus includes an ejection port switching portion provided with plural openings having different shapes. However, whereas the three-dimensional modeling apparatus of the first exemplary embodiment includes the plate-like member 14 having a disk-like shape, the three-dimensional modeling apparatus of the second exemplary embodiment includes a plate-like member having a rectangular shape. In addition, whereas the plate-like member 14 is rotated in the first exemplary embodiment for selecting an arbitrary ejection port and aligning the selected ejection port with the outlet of the nozzle 4, the plate-like member is linearly moved in the second exemplary embodiment for aligning a selected ejection port with the outlet of a nozzle.

Figure 10:
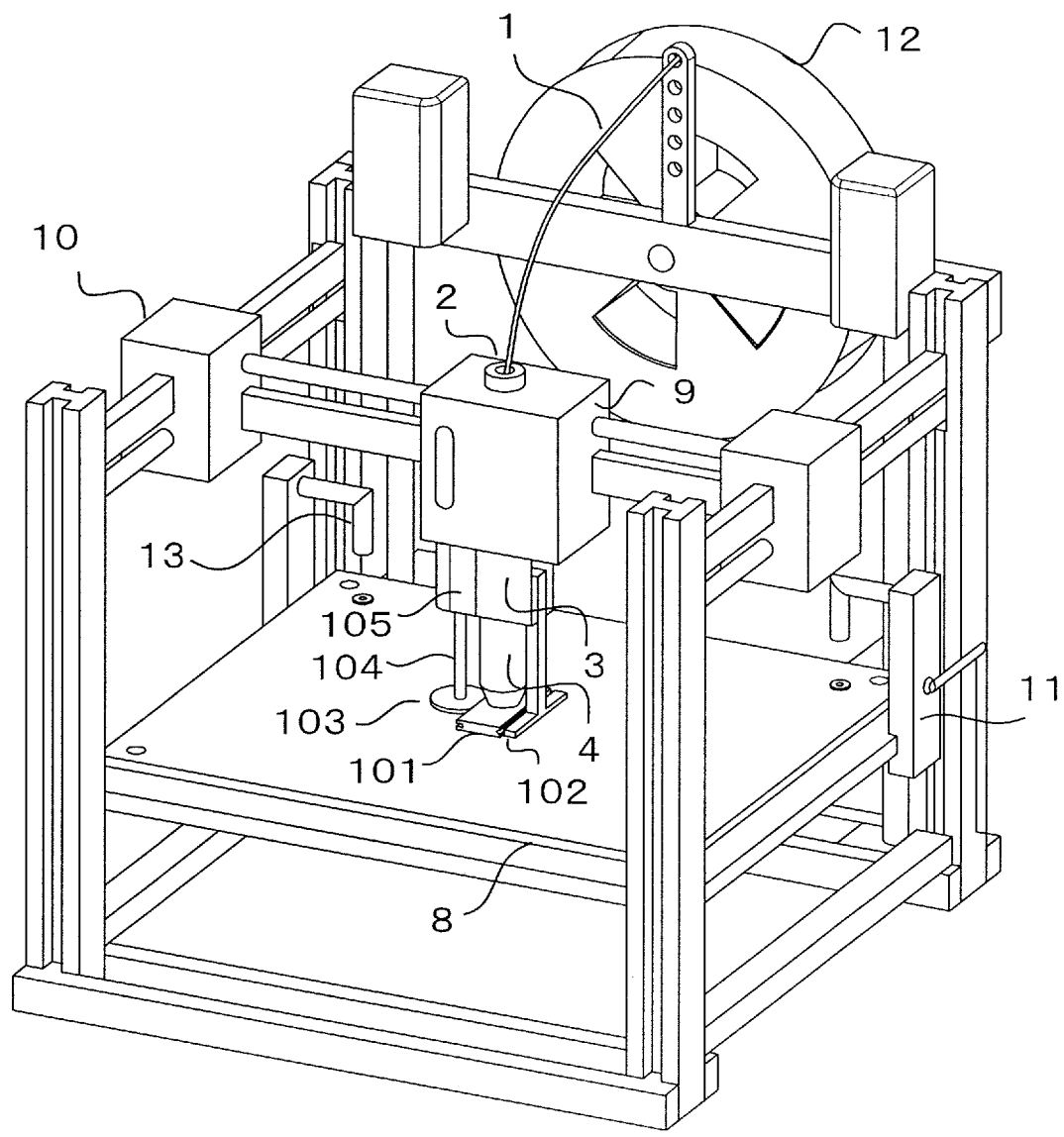
FIG. 10 is a perspective view of a three-dimensional modeling apparatus of a second exemplary embodiment.

FIG. 10 is a perspective view of a fused deposition modeling apparatus of the second exemplary embodiment.

The fused deposition modeling apparatus of the second exemplary embodiment includes a material introduction portion 2, a heating supplying portion 3, a nozzle 4, a stage 8, an X movement mechanism 9, a Y movement mechanism 10, a Z movement mechanism 11, a reel 12, and a cleaning mechanism 13, and a modeling material 1 is set in the material introduction portion 2. Since these components are similar to the first exemplary embodiment, the description thereof will be omitted.

Ejection Port Switching Portion

An ejection port switching portion of the second exemplary embodiment will be described. FIG. 10 illustrates a plate-like member 101, a rail 102, a driving gear 103, a switch drive shaft 104, and a switch driving device 105.

The plate-like member 101 is supported by the rail 102 so as to be capable of moving back and forth parallel to the Y axis. That is, the plate-like member 101 is disposed so as to be slidable on the distal end surface of the nozzle 4 and is supported so as to be linearly movable. In addition, teeth that engage with the driving gear 103 are formed on an edge portion of the plate-like member 101 on the driving gear 103 side, and the plate-like member 101 moves back and forth parallel to the Y axis by rotating the driving gear 103. The driving gear 103 is fixed to the switch drive shaft 104, and a driving force is applied thereto by the switch driving device 105.

Figure 11:
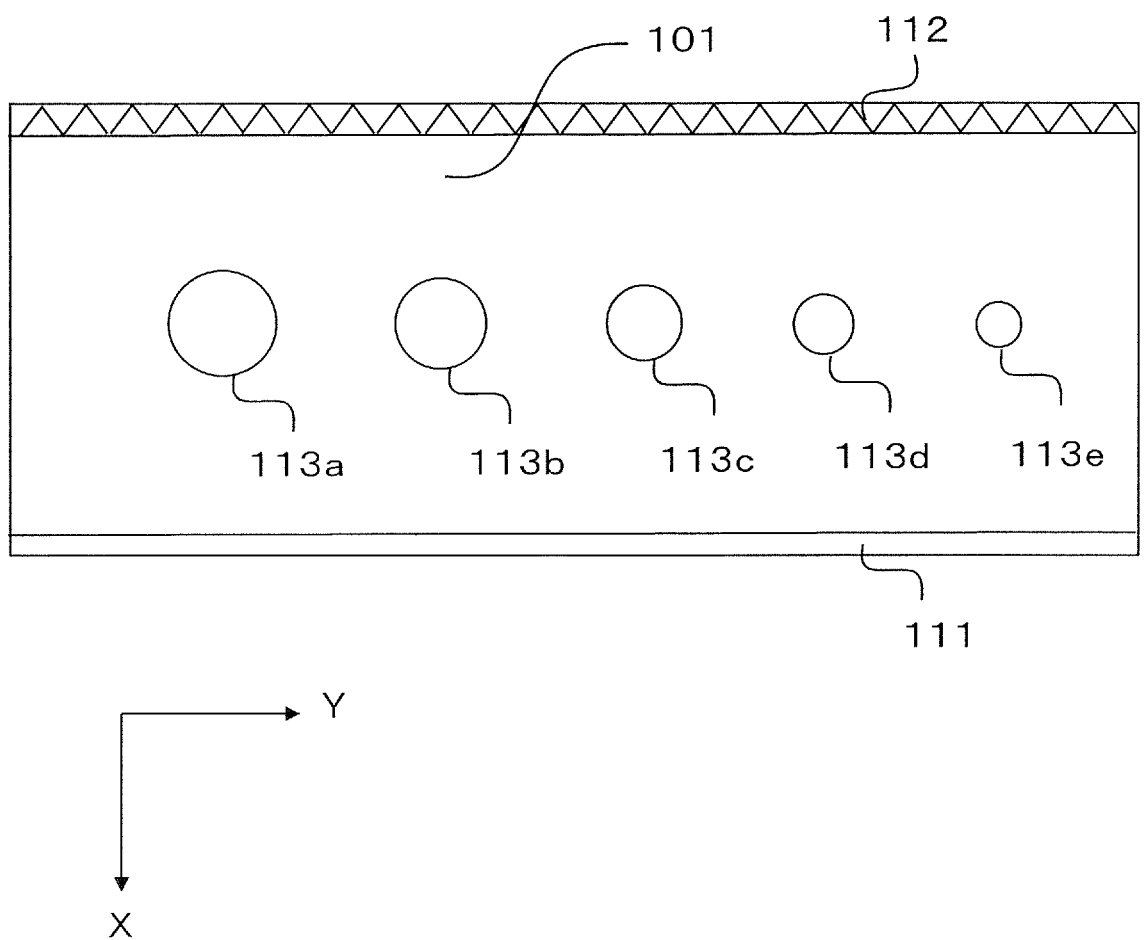
FIG. 11 is a plan view of a plate-like member of an ejection port switching portion of the second exemplary embodiment.

FIG. 11 illustrates a plan view of the plate-like member 101 of the present exemplary embodiment.

In the present exemplary embodiment, the plate-like member 101 has a rectangular shape, and five circular openings 113a to 113e are defined in the plate-like member 101. The openings 113a to 113e serve as ejection ports for the thermoplastic resin, and the diameters thereof are different from one another. A rail engagement portion 111 that engages with the rail 102 is provided on one of the long sides of the plate-like member 101. In addition, teeth 112 that engage with the driving gear 103 are provided on the other of the long sides.

The openings 113a to 113e are arranged along the Y direction with intervals therebetween such that each of the openings 113a to 113e can overlap the distal end portion of the nozzle 4 in the case where the driving gear 103 rotates about the switch drive shaft 104. By rotating the driving gear 103 coupled with the switch drive shaft 104 by the switch driving device 105, any one of the openings 113a to 113e can be caused to overlap the distal end portion of the nozzle 4, and a portion not provided with an opening can be also caused to overlap the distal end portion of the nozzle 4.

Any device may be used as the switch driving device 105 as long as the switch driving device 105 can switch the openings 113a to 113e. For example, there is a method of switching the openings 113a to 113e by rotating the switch drive shaft 104 by just a desired angle by using a typical electric motor such as a stepping motor that generates a rotational force. In addition, a mechanism that includes an encoder for detecting the rotational position of the switch drive shaft 104 or the driving gear 103 or a clutch or a brake for stopping the rotation and fixing the position may be employed. In addition, the mechanism that linearly moves the plate-like member 101 is not limited to the example of FIG. 9, and, for example, a piston mechanism that performs control by using air pressure, oil pressure, or the like, a mechanism that converts rotational motion of a motor or the like into a linear motion by using a rack and pinion, and so forth may be employed.

The diameter of the thermoplastic resin ejected as a columnar viscous fluid can be controlled by appropriately selecting an opening to overlap the distal end portion of the nozzle 4 among the five openings 113a to 113e. In addition, the plate-like member 101 functions as a shutter in the case where a portion thereof not provided with an opening is caused to overlap the distal end portion of the nozzle 4, and thus the ejection of the thermoplastic resin can be stopped.

It is preferable that metal is used as the material of the plate-like member 101, and, in particular, steel having a high toughness and a high thermal conductivity is preferably used. Examples of the preferable material include SUS420J2, SKD61, and pre-hardened steel.

In addition, various coating treatment may be performed for the purpose of improving the durability of the plate-like member 101 and resin releasability of the openings 113a to 113e. For example, coating treatment using diamond-like carbon (DLC) used for parts of a machine tool, molds for injection molding, and so forth may be employed. Further, surface hardening treatment such as nitriding treatment and high-frequency firing, and so forth are also effective for improving the durability. A case where treatment is performed on a contact portion between the plate-like member 101 and the nozzle 4 for improving the slidability and durability of the contact portion, a case where treatment is performed on the inner surfaces of the openings 113a to 113e which the fused resin passes through, and so forth can be considered.

Although the openings 113a to 113e have circular shapes of different diameters in the present exemplary embodiment, the shapes of the openings 113a to 113e are not limited to the shapes described above, and various shapes can be considered.

For example, in the case where the sectional shape of the ejected resin is desired to be changed in terms of an aspect ratio between the X direction and the Y direction, elliptical shapes and rectangular shapes whose aspect ratio is not 1 can be considered.

It is preferable that the thickness of the plate-like member 101 is small as long as a mechanical strength is ensured. In the case where the thickness is larger, the heat capacity becomes larger. In this case, the plate-like member 101 cannot be sufficiently heated by only heat conduction from the nozzle 4 and the thermoplastic resin, and thus there is a possibility that the temperature near the openings 113a to 113e drops and clogging with the fused resin occurs.

In the case of increasing the thickness of the plate-like member 101, a heating mechanism can be included in the plate-like member 101. Since it is typically preferable that the fused thermoplastic resin is caused to flow in the nozzle 4 at a temperature of about 200° C., it is desirable that the nozzle 4 and the plate-like member 101 are also kept at about 200° C. By including the heating mechanism, the plate-like member 101 can be kept at about 200° C. the whole time, and thus clogging of the openings 113a to 113e with the fused resin can be suppressed. In addition, also in the case where the opening is switched while modeling is performed, the temperature of the vicinity of an opening to which the switching has been performed is kept at an appropriate temperature. Therefore, it is not needed to wait for the temperature to rise, and thus the time loss for the switching can be reduced.

In the case of increasing the thickness of the plate-like member 101 without including the heating mechanism, a method of reducing the heat capacity of the plate-like member 101 by providing lightening holes that reduce the weight of the plate-like member 101 is also effective. In this case, in order to prevent the rigidity of the plate-like member 101 from decreasing, it is preferable to provide lightening holes that can ensure the rigidity while reducing the weight, such as lightening holes having a honeycomb shape.

As described above, any member can be used as the plate-like member 101 of the present exemplary embodiment as long as the plate-like member 101 is provided with an opening serving as an ejection port, the mechanical strength of the plate-like member 101 is ensured, and the plate-like member 101 can be kept at a temperature at which the thermally fused resin is not solidified. Accordingly, this member may be referred to as an ejection port member instead of a plate-like member. Although this member is referred to as a plate-like member in the description of the present exemplary embodiment, the shape of the member is not necessarily a flat plate shape, and members of various three-dimensional shapes can be used.

In the present exemplary embodiment, a plate-like member moves linearly, and thus the shape of a space used in the vicinity of a nozzle is different from the first exemplary embodiment. Therefore, the configuration of the present exemplary embodiment is suitable in the case where a linear operation is better than a rotational operation in terms of space usage efficiency depending on the wiring in the apparatus, the configuration of components in the vicinity of the nozzle, and so forth.

Other Exemplary Embodiments

Although a plate-like member is provided with one circular opening for each different diameter in the first exemplary embodiment and the second exemplary embodiment, embodiments of the present invention are not limited to these.

Figure 12A:
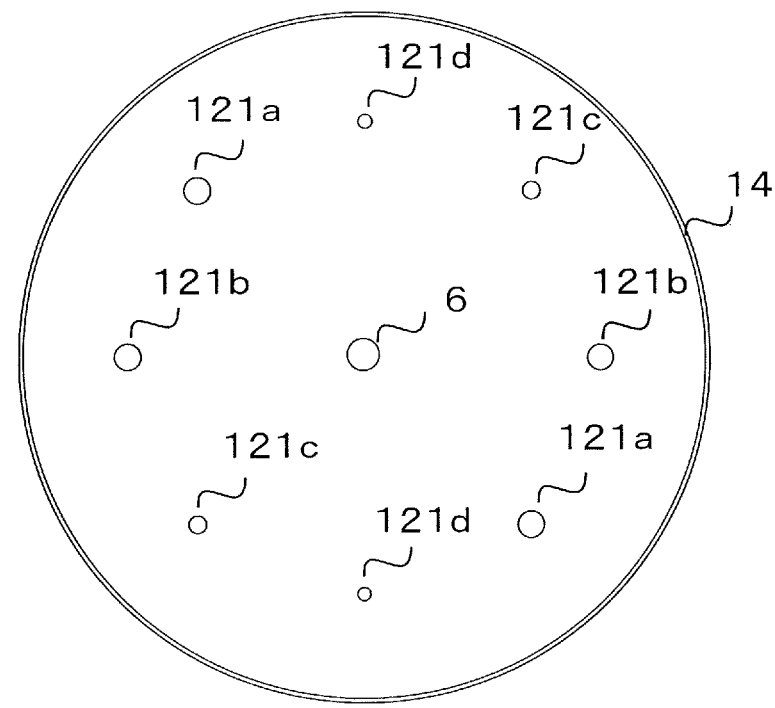
FIG. 12A is a plan view of a plate-like member of another exemplary embodiment.

For example, two openings may be provided for each of plural different sizes. FIG. 12A illustrates a plan view of an exemplary plate-like member of this embodiment, and the plate-like member include openings 121a, 121b, 121c, and 121d each provided in a number of two for each different diameter. By providing two openings of the same size, one opening can be used as a reserve, and thus the reliability and durability of the apparatus can be improved. Of course, the number of openings of the same size is not limited to two, and more openings of the same size may be provided. It is also preferable to increase the number for the opening size with a high usage frequency.

In the example of FIG. 12A, openings of the same size are disposed so as to be on the opposite sides to each other with the switch drive shaft 6 interposed therebetween. If openings of the same size are disposed on the opposite sides to each other, one opening can be cleaned while the other opening is coupled with a nozzle and used in the case where a cleaning mechanism is provided in the vicinity of the nozzle in an integral manner. Since at least one of the openings of each size can be kept in a clean state, this is advantageous in the case where switching of ejection port is performed frequently.

In addition, although plural circular openings having different diameters are employed as ejection ports in the first exemplary embodiment and the second exemplary embodiment, embodiments of the present invention are not limited to these. Plural openings having shapes appropriately selected from circular shapes, elliptical shapes, square shapes, rectangular shapes, triangular shapes, other polygonal shapes, and so forth may be provided.

Figure 12B:
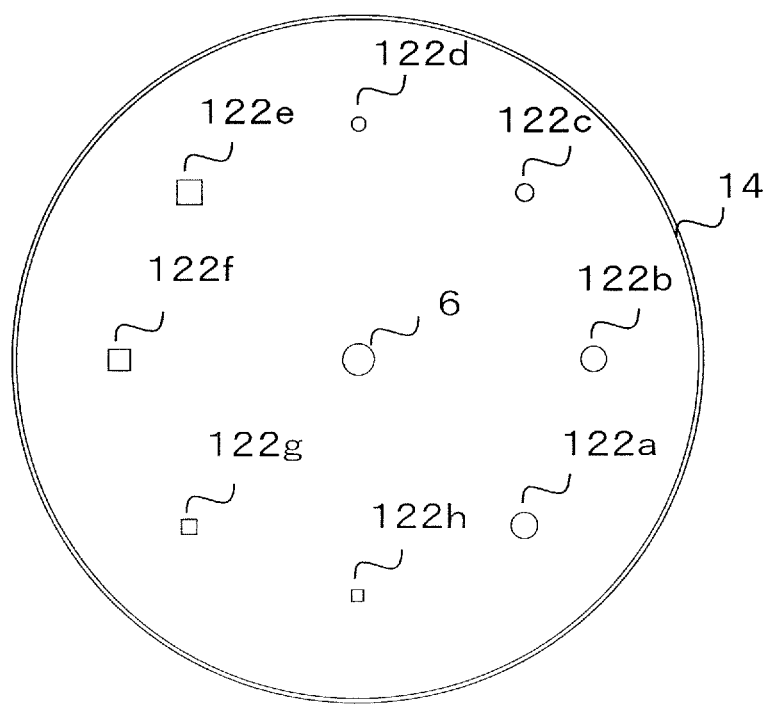
FIG. 12B is a plan view of a plate-like member of yet another exemplary embodiment.

FIG. 12B is a plan view of one example of these, and circular openings 122a, 122b, 122c, and 122d of different sizes and square openings 122e, 122f, 122g, and 122h of different sizes are provided in the plate-like member. A circular opening and a square opening disposed on the opposite side to each other with a drive shaft interposed therebetween are configured to have the same area. Although the amounts of fluid ejected per unit time are substantially the same due to the same opening area, the fused columnar resin can be ejected in different sectional shapes.

By selecting and using an ejection port having the most appropriate shape, area, sectional taper shape, and so forth in accordance with a model shape and a surface texture of the three-dimensionally modeled object to be formed, the precision of the shape of the three-dimensionally modeled object can be improved, and time required for modeling can be reduced. This also applies to other embodiments than the examples described above.

Figure 13:
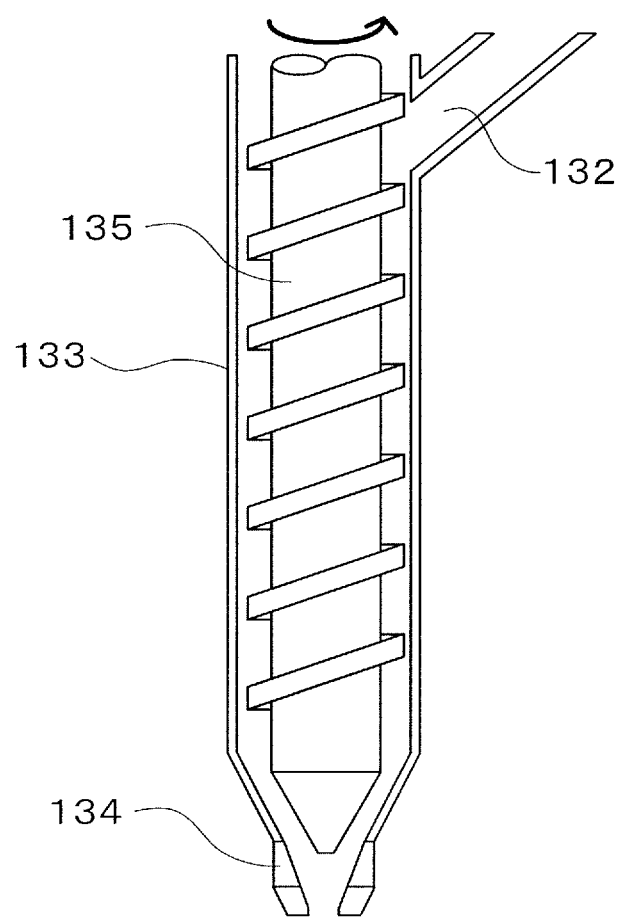
FIG. 13 illustrates a material introduction portion for supplying a pellet-type material, a heating supplying portion, and a nozzle.

In addition, although an example in which a thermoplastic resin shaped into a filament is used as a raw material used for three-dimensional modeling has been described in the first exemplary embodiment, materials of other forms such as pellets and powder can be also used. In the case of using a pellet-type material as the thermoplastic resin, the same apparatus and the same method as the first exemplary embodiment can be used for the other parts than the material introduction portion 2, the heating supplying portion 3, and the nozzle 4 in the fused deposition modeling apparatus illustrated in FIG. 1. FIG. 13 illustrates a part, corresponding to the material introduction portion 2, the heating supplying portion 3, and the nozzle 4 of FIG. 1, of a fused deposition modeling apparatus used in the case of using a pellet-type material.

FIG. 13 illustrates a part including a material introduction portion 132, a heating supplying portion 133, and a nozzle 134. A pellet-type resin material is supplied from the material introduction portion 132, and the resin material is fused by a screw 135 of the heating supplying portion 133. The fused thermoplastic resin is sent into the nozzle 134 by the rotation of the screw 135. The thermoplastic resin pushed to the distal end portion of the nozzle 134 is ejected through an ejection port selected by the ejection port switching portion 5 illustrated in FIG. 1. Then, the plate-like member is rotated similarly to the first exemplary embodiment, and thus the opening to overlap the nozzle 134 is switched among plural openings. In addition, similarly to the first exemplary embodiment, the plate-like member functions as a shutter when a part not provided with an opening is caused to overlap the distal end portion of the nozzle 134, and thus the ejection of the thermoplastic resin can be stopped. Alternatively, the ejection of the thermoplastic resin from the ejection port can be stopped by rotating the screw 135 in a direction opposite to the direction in which the thermoplastic resin is pushed toward the nozzle 134. The opening to overlap the nozzle 134 among the plural openings can be switched also by rotating the plate-like member after stopping the ejection from the ejection port.

According to the exemplary embodiments of the present invention described above, a three-dimensional modeling apparatus that is small and capable of easily changing the sectional shape of the ejected fused resin can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-212083, filed Oct. 28, 2016, and Japanese Patent Application No. 2017-156167, filed Aug. 10, 2017, which are hereby incorporated by reference herein in their entirety.

What is claimed is:

1. A three-dimensional modeling apparatus comprising:
a heating portion configured to heat and fuse a thermoplastic resin;
a nozzle configured to guide the fused thermoplastic resin to an ejection port, the fused thermoplastic resin being moved toward the ejection port by rotating a rotation portion in a first direction, the rotation portion comprising a roller or a screw;
a member disposed on a distal end surface of the nozzle, the member comprising plural ejection ports;
an ejection port switching portion configured to align one ejection port among the plural ejection ports with a distal end of the nozzle; and
a control portion,
wherein the control portion is configured to:
rotate the rotation portion in the first direction, in a first step, so that the fused thermoplastic resin is ejected from a first ejection port, which is aligned with the distal end of the nozzle;
control the ejection port switching portion, in a second step, to change the one ejection port aligned with the distal end of the nozzle, from the first ejection port to a second ejection port among the plural ejection ports;
rotate the rotation portion in the first direction, in a third step, so that the fused thermoplastic resin is ejected from the second ejection port; and
rotate the rotation portion in a rotating direction that is an inverse of the first direction, after the first step and before the second step, so as to stop the fused thermoplastic resin from being moved toward the first ejection port.

2. The three-dimensional modeling apparatus according to claim 1, wherein the member has a portion not provided with the plural ejection ports, and
wherein the portion not provided with the plural ejection ports functions as a shutter in a case where the portion not provided with the plural ejection ports is aligned with the distal end of the nozzle.

3. The three-dimensional modeling apparatus according to claim 1, wherein the ejection port switching portion is configured to align the one ejection port among the plural ejection ports with the distal end of the nozzle by rotating the member.

4. The three-dimensional modeling apparatus according to claim 1, wherein the ejection port switching portion is configured to align the one ejection port with the distal end of the nozzle by linearly moving the member.

5. The three-dimensional modeling apparatus according to claim 1, wherein the plural ejection ports comprise ejection ports having different areas.

6. The three-dimensional modeling apparatus according to claim 1, wherein the plural ejection ports comprise ejection ports having different shapes.

7. The three-dimensional modeling apparatus according to claim 1, further comprising a heater attached to or built in the member and configured to keep the member at about 200° C.

8. The three-dimensional modeling apparatus according to claim 1, further comprising a cleaning mechanism configured to clean an ejection port among the plural ejection ports by using a gas, splashing a liquid, or inserting a solid.

9. The three-dimensional modeling apparatus according to claim 8, wherein the ejection port switching portion is configured to align an ejection port among the plural ejection ports with the cleaning mechanism.

10. The three-dimensional modeling apparatus according to claim 1, further comprises a monitor configured to monitor whether cleaning of the one ejection port aligned with the distal end of the nozzle is needed based on a temperature of the fused thermoplastic resin or on an elapsed time after starting a modeling operation.

11. The three-dimensional modeling apparatus according to claim 1, wherein the one ejection port among the plural ejection ports is configured such that a cross-sectional area of the one ejection port at an upstream side with respect to a direction in which the fused thermoplastic resin proceeds through the one ejection port is larger than a cross-sectional area of the one ejection port at a downstream side with respect to the direction in which the fused thermoplastic resin proceeds through the one ejection port.

12. The three-dimensional modeling apparatus according to claim 11, further comprising a cleaning mechanism, which comprises an air blowing port configured to blow air to the one ejection port among the plural ejection ports in a direction from the downstream side to the upstream side.

13. The three-dimensional modeling apparatus according to claim 8, wherein the cleaning mechanism comprises a first air blowing port and a second air blowing port located opposite the first air blowing port such that the member is between the first air blowing port and the second air blowing port.

14. A method of a controlling a three-dimensional modeling apparatus, wherein the three-dimensional modeling apparatus comprises:
a heating portion configured to heat and fuse a thermoplastic resin;
a nozzle configured to guide the fused thermoplastic resin to an ejection port, the fused thermoplastic resin being moved toward the ejection port by rotating a rotation portion in a first direction, the rotation portion comprising a roller or a screw;
a member disposed on a distal end surface of the nozzle, the member comprising plural ejection ports;
an ejection port switching portion configured to align one ejection port among the plural ejection ports with a distal end of the nozzle; and
a control portion,
the method comprising:
rotating the rotation portion in the first direction by the control portion, in a first step, so that the fused thermoplastic resin is ejected from a first ejection port, which is aligned with the distal end of the nozzle;

controlling the ejection port switching portion by the control portion, in a second step, to change the one ejection port aligned with the distal end of the nozzle, from the first ejection port to a second ejection port among the plural ejection ports;

rotating the rotation portion in the first direction by the control portion, in a third step, so that the fused thermoplastic resin is ejected from the second ejection port; and rotating the rotation portion in a rotating direction that is an inverse of the first direction by the control portion, after the first step and before the second step, so as to stop the fused thermoplastic resin from being moved toward the first ejection port.

* * * * *